Sept. 9, 1969　　　　　　J. BELART　　　　　　3,465,852
FLOATING-YOKE DISK BRAKE FOR DUAL-NETWORK VEHICLE BRAKE SYSTEM
Filed Feb. 12, 1968　　　　　　　　　　　　2 Sheets-Sheet 1

JUAN　BELART
*INVENTOR.*

Sept. 9, 1969  J. BELART  3,465,852
FLOATING-YOKE DISK BRAKE FOR DUAL-NETWORK VEHICLE BRAKE SYSTEM
Filed Feb. 12, 1968  2 Sheets-Sheet 2

JUAN BELART
INVENTOR.

United States Patent Office 3,465,852
Patented Sept. 9, 1969

3,465,852
FLOATING-YOKE DISK BRAKE FOR DUAL-NETWORK VEHICLE BRAKE SYSTEM
Juan Belart, Walldorf, Germany, assignor to Alfred Teves G.m.b.H., Frankfurt am Main, Germany, a corporation of Germany
Filed Feb. 12, 1968, Ser. No. 704,790
Claims priority, application Germany, Feb. 15, 1967, T 33,208
Int. Cl. B60t 11/24; F16d 65/14
U.S. Cl. 188—152        7 Claims

ABSTRACT OF THE DISCLOSURE

A floating-yoke disk brake in a dual-network system in which the hydraulic fluid transmitted by each network is supplied to only one pressure-responsive, separate and independent surface area of the wheel-brake piston. A self-adjusting mechanism resets the position of the piston relative to the brakeshoe whenever there has been significant wear of the brake lining.

Figure 1:
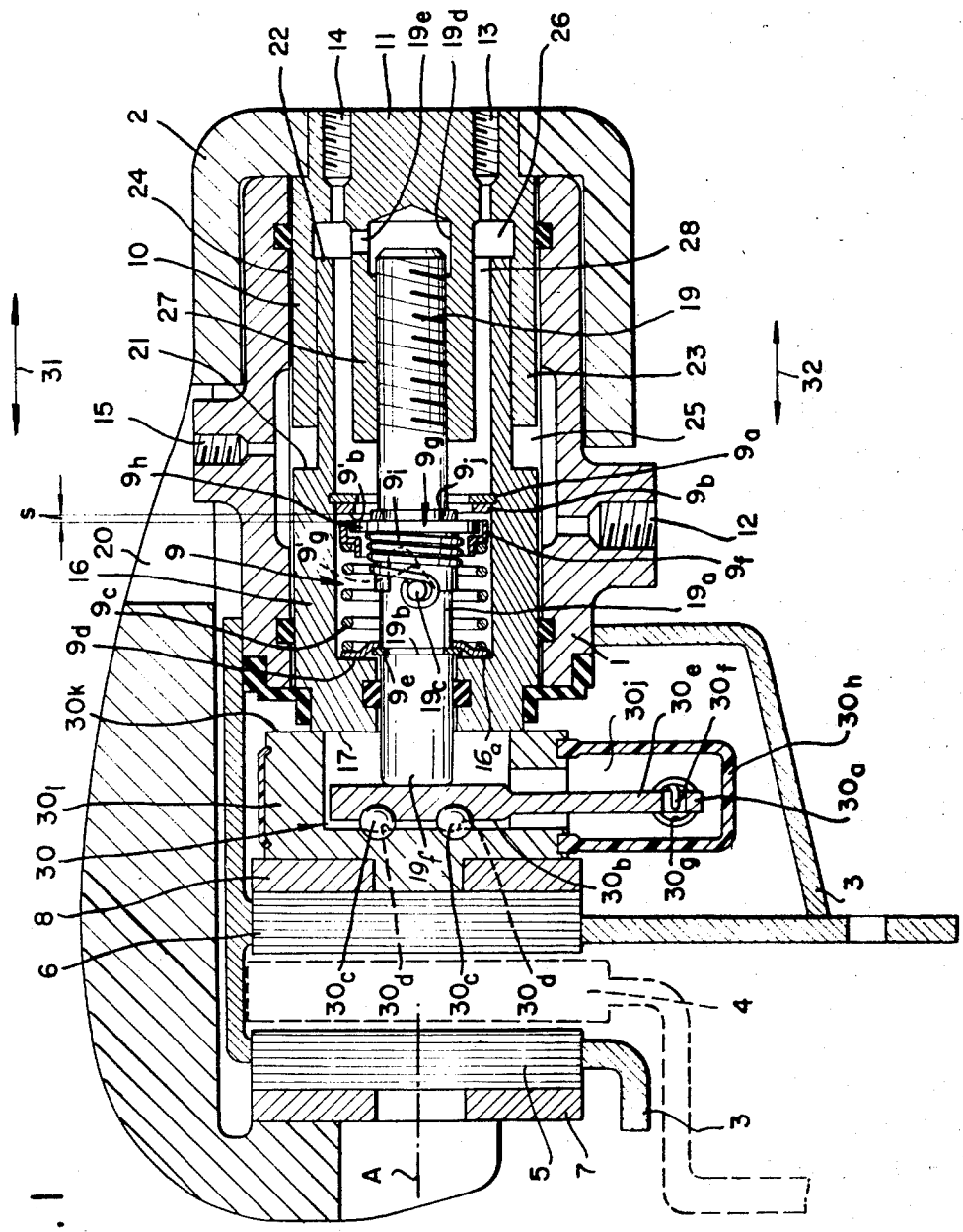

My present invention relates to a hydraulic vehicle brake and, fore particularly, to a floating-yoke disk brake in a dual-network system which is provided with a self-adjusting mechanism for resetting the rest position of the piston upon wear of the brake lining.

This invention relates to disk-brake systems which, in part, are based upon principles originally disclosed in the commonly assigned copending application Ser. No. 681,330, filed Nov. 8, 1967 by myself and H. Marschall, H. A. Beller, H. Hahm, and W. Kammermayer and entitled "Piston Assembly For Dual-Network Disk-Brake System" and my prior application Ser. No. 700,584 filed Jan. 25, 1968 and entitled "Floating-Yoke Disk Brake With Wear-Compensating Mechanism."

In the first of these applications, it has been pointed out that dual-network brake systems have gained in interest of late and, in fact, may be required in many jurisdictions. The term "Dual-Network Brake System," as used herein, is intended to designate a vehicular brake system in which the master cylinder is subdivided into a pair of compartments, each of which may communicate with a respective portion of a subdivided brake-fluid reservoir and receives a respective master-cylinder piston operated by the brake pedals of the vehicle. In so-called "tandem master cylinders," the master-cylinder compartments are disposed one behind the other while the coaxially aligned but axially spaced pistons received in these chambers can be coupled by rods, springs or other force-transmitting means. From each of the master-cylinder compartments, a respective fluid-transmitting network of hydraulic tubes or lines runs to respective sets of wheel-brake cylinders. In application Ser. No. 681,330 it has been pointed out that it is possible to provide a cylinder assembly for disk-type brakes of an automotive vehicle which is of reduced cost and complexity, permits actuation by cylinder means on only one side of the wheel-brake housing, is of relatively small dimension to permit the brake housing to be accommodated in the dished tire-carrying wheel disk of the vehicle, has a minimum number of parts and few force-transmitting members, and applies substantially the same frictional brake surface and/or brake force in spite of a failure of one of the networks without giving rise to unduly increased brake-pedal stroke. In that improved system, the brake housing reaches around the periphery of a brake disk which is rotatably connected with a wheel of the automotive vehicle and has, at one side of the disk, an actuating cylinder containing at least one piston subdividing the cylinder means into a pair of independent working chambers effective to urge the brakeshoes flanking the disk in opposite directions against the latter, the chambers being supplied with brake fluid from respective fluid-transmission networks to which the brake fluid is delivered from a dual-compartment master-cylinder assembly. The master-cylinder assembly can be a tandem-type master cylinder in which the compartments are disposed one behind the other, or a so-called "twin" master cylinder in which the compartments are disposed side by side. The yoke of this system is shiftable relatively to the disk and bears directly against the brakeshoe remote from the actuating cylinder so that reaction force generated by supplying brake fluid under pressure to the aforementioned chambers, shifts the brake yoke to indirectly apply its remote brakeshoe to the disk. It has also been pointed out there that the piston can be stepped, i.e. provided with a large-diameter portion defining an outer annular compartment and a small-diameter portion defining the other compartment of the assembly.

In the later-filed application mentioned above, I have described and claimed a floating-yoke disk brake with an improved wear-compensating mechanism for resetting the brake play upon wear of a brakeshoe. The brakeshoes, which generally extend over only a sector of the disk, have backing plates engageable by the piston and carrying the brake linings which confront and frictionally engage the disk. In that system I have also provided between the brakeshoe and the piston means a manually operable device for spreading the brakeshoe and the piston apart and thereby driving the brakeshoe against the disk independently of the hydraulic means so as to enable the system to act as a hand brake, emergency brake or locking brake.

Thus, dual-network brake systems in which the pressure applied to the brake pedal is transmitted by a fluid from the master cylinder to the wheel cylinders become frequently inoperative at the temporary and unforeseen failure of one of the networks, when the still functioning components of the remaining network are unable to withstand the total pressure that is concentrated upon them. The resulting overloading or one-sided loading impairs the effectiveness of the brake system and contributes to premature deterioration of its parts.

It is the principal object of the present invention to avoid these drawbacks and to provide a safe, simple and compact dual network brake system comprising a disk brake in a floating-yoke assembly, whose effectiveness is maintained when one of the two networks is temporarily inoperative.

Another object of this invention is to provide braking power for all four wheels though one network only may be functioning.

Still another object is to provide an improved floating-yoke disk brake incorporating an automatically adjusting means for compensating for wear of the brake lining.

Yet a further object of this invention is to extend the principles of the aforementioned copending applications.

These objects and others which will become apparent hereinafter are attained, according to my invention, by dividing the pressure-responsive surface of the piston in the wheel-brake cylinder into two separate parts which face in the same direction but are spatially distant and sealed off from one another. Each of the separate surfaces responds to the pressure transmitted through one network only. Thus, the brake fluid pressure of the master cylinder is substantially uniformly divided over two independent surfaces of the same piston, so that the failure of one of the networks does not impair the symmetry of the braking force, even though its effectiveness will be reduced proportionally.

Figure 2:
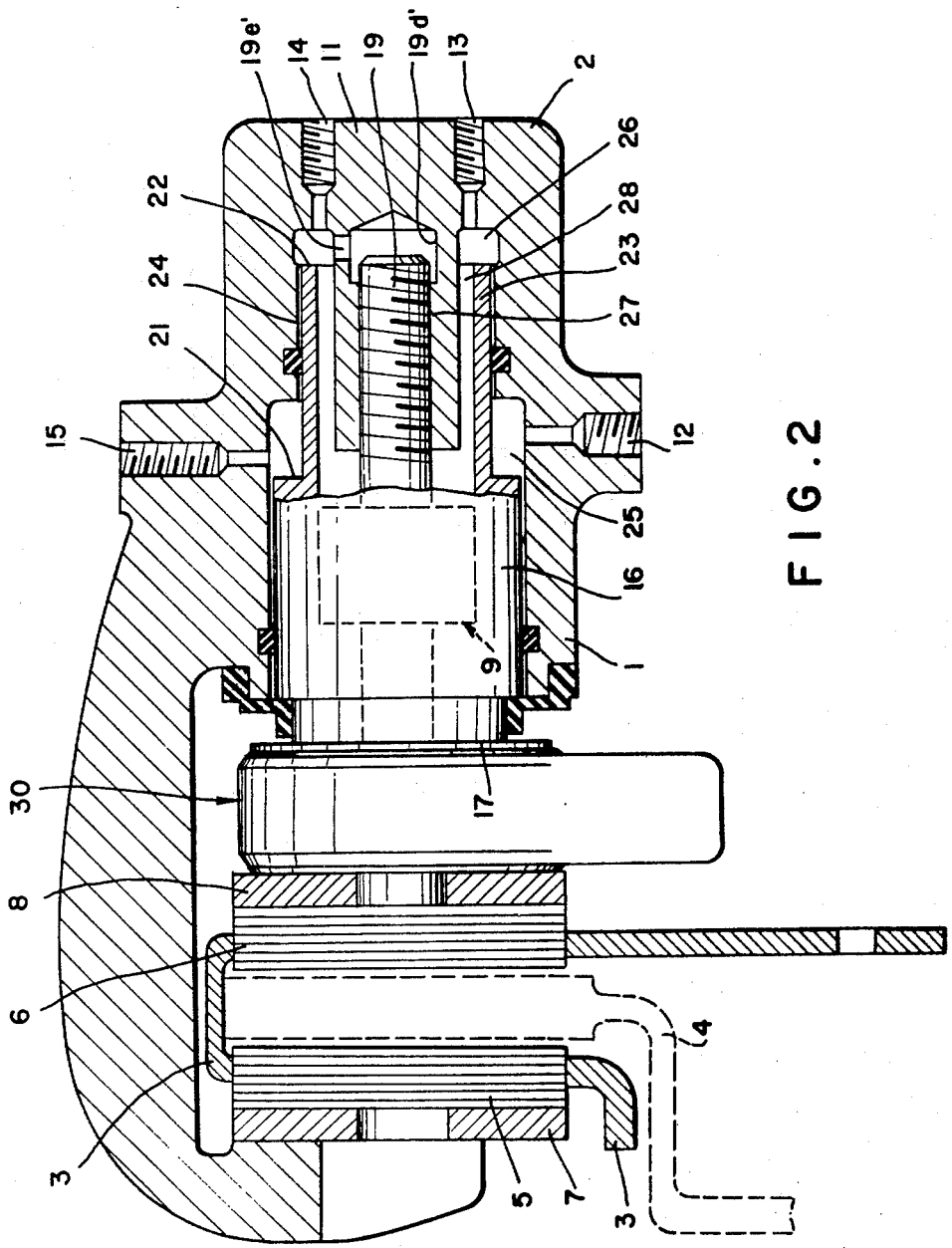

The above and other objects, features and advantages of the present invention will become more readily apparent from the following description in which:

FIG. 1 is a fragmentary axial cross-sectional view of a portion of a floating-yoke disk brake embodying the present invention; and FIG. 2 is a simplified embodiment of the view shown in FIG. 1.

According to the drawing, the floating-yoke brake shown, is mounted in accordance with the usual practice (see application Ser. No. 681,330) so as to permit movement of the yoke housing 2 in the direction of the arrow 31, that is transversely to the disk 4. The wheel side of the disk 4 is provided with a wheel brake cylinder consisting of a sleeve sealingly received in the hollow yoke lobe, in which a hollow piston 16 is axially displaceable (arrow 32). At its face 17 the piston 16 bears against a force-transmitting device 30 whose opposite side bears upon a brakeshoe consisting of the backing plate 8 and the brake lining 6. The device 30 serving as an alternative of, or an addition to, the hydraulically operated foot brake, is formed as a mechanically operable spreader operable either through a pedal or control lever of a manual handbrake.

The mechanically operable brake-actuating means of this system may comprise, as described in my copending application Ser. No. 700,584, a lever 30a whose disk portion 30b co-operates with a plurality of angularly equispaced balls 30c (preferably three spaced about the axis A of the device by 120° from one another) which ride in camming seats 30d to cam the brakeshoe 6, 8 to the left when the disk 30b is swung about the axis A. The arm 30e of this lever co-operates with the core wire 30f of a Bowden cable which passes through an opening 30g in a dust-excluding rubber boot 30h and extends to the left of the driver's compartment of the vehicle to enable the vehicle operator to bring the brakeshoe 6, 8 into engagement with the disk 4 as a parking, emergency or locking brake. The force is transmitted from the piston 16 to the brakeshoe 6, 8 via a housing member 30i forming with the front face 17 of the piston a chamber 30j. The face 17 of the piston bears directly upon the annular surface 30k of the housing to transmit force to the brakeshoe when hydraulic pressure is supplied without the intermediary of the mechanism-actuating means. However, the disk 30b reacts against the end 19f of the spindle 19 to spread the brakeshoe away from the piston when manual brake operation is desired.

The brake lining 6 and the backing plate 8 as well as their counterparts, the brake lining 5 and the backing plate 7 on the opposite side of the brake disk 4, are slidably supported in the brake housing 3.

The tubular surface of the piston 16 is stepped down at approximately the midpoint of its axial length, to form a piston extension 23 of lesser diameter (small-diameter step) than that of the other part. The annular surface 21 produced at the junction of the two tubular parts is of an effective area identical to that of the surface 22 at the end of the piston facing away from the brake assembly plus the surface 16a. The chambers 25 and 26 respectively, of which these surfaces form one wall, serve as reservoirs for the hydraulic fluid transmitted under pressure from the dual master cylinder via the ports 12 and 13 respectively via respective networks (see application Ser. No. 681,330). A passage 20 in the yoke housing 2 provides an outlet 15 for a bleeding or venting valve of conventional constructions for one network, while the other network is vented through the valve 14 at the floor or outer face 11 of the yoke housing 2; a suitable valve structure is shown in application Ser. No. 700,515 filed Jan. 25, 1968 and in Principles of Automotive Vehicles, U.S. Government Printing Office, Washington, D.C., 1956, pages 938 and 439.

Piston 16 as well as its extension 23 are hollowed out to house a self-adjusting mechanism 9 for resetting the rest position of the piston 16 upon wear of the brake lining 5. In the appended drawing the components of a mechanism of this kind comprise the hollow or tubular boss 27 formed with an internal screw thread and lying coaxially within the piston 16. Boss 27 is mounted at the floor 11 of the yoke housing 2 within the piston 10. A bolt or spindle 19 is threaded into the boss 27 and co-operates with the automatically operable self-adjusting means 9 to advance the piston 16 whenever the brake lining suffers wear.

The wheel-brake cylinder 1 is firmly attached to the brake housing 3 and axially displaceable in the yoke housing 2. The extension 23 of the piston 16 lies in the cylindrical bore 24 of another piston 10 which is axially slidable within the wheel brake cylinder 1. Piston 10 is stepped at its end opposite the brake assembly and fits into an appropriate recess or bore of the yoke housing 2 at its end face 11.

The automatic wear-compensating means 9 of FIGS. 1 and 2 comprises a split ring 9a received in a groove of the stepped piston 16 against which a friction ring 9b is held by a coil spring 9c surrounding the nonthreaded portion 19a of the spindle 19. The spring 9c reacts against a spring seat 9d which bears upon a split ring 9e received in a groove 19b of the nonthreaded portion 19a of the spindle. The spring 9c also bears against a cylindrical member 9f. Within this member 9f, a friction sleeve 9g is axially and rotatably mounted on the nonthreaded portion 19a of the spindle and has arms 9h frictionally engageable with the surface 9b' of ring 9a as is fully described in my copending application Ser. No. 700,515 filed Jan. 25, 1968 and entitled "Adjusting Device For Disk Brake." The sleeve 9g is formed with a camming surface 9g' engageable with a transverse pin 19c of the spindle while a torsion spring 9i tends to urge the spindle and the sleeve 9g into its normal position as illustrated in FIGS. 1 and 2.

During normal brake-operating procedure, i.e. in the absence of brake-lining wear, the piston 16 is advanced to the left to drive the brakeshoe 6, 8 in this direction against the disk 4. When the normal brake play s is exceeded because of wear of one or both of the linings 5, 6, the surface 9b' of ring 9b engages the friction arms 9h of the sleeve 9g and advances this sleeve axially to the left while inhibiting its rotation. The pin 17 thus rides upwardly along the camming flank 9g' to rotate the spindle 19 and advance it to the left by an amount equal to that by which the actual brake play exceeds the predetermined play s. Upon hydraulic release of the piston, it is urged to the right by spring 9c while the torsion spring 9i rotates the sleeve 9g back to the position illustrated. The engagement of the bottom surface 16a of the piston with the ring 9e establishes a new rest position for the piston. A seal 16b surrounds the spindle 19 and prevents escape of fluid from the inner compartment of the wheel-brake cylinder. A further split ring 9j provides a stop at the right-hand side of the adjusting device 9 for the sleeve 9g. Other constructions and operating characteristics of the adjusting means are set forth in the last-mentioned copending application. It may be noted, however, that the internally threaded bore 19d or 19d' into which the spindle 19 is threaded, preferably has a radial bore 19e or 19e' adapted to prevent development of pressure in the bore when the spindle is threaded into it.

An annular clearance or spacing between the exterior wall of the boss 27 and the interior wall of the piston extension 23 is formed as a ring chamber which connects the interior of the piston 16 with the chamber 26 and permits pressurized fluid, admitted through the port 13, to circulate inside the piston 16.

For hydraulic operation of the brake system, the brake fluid is supplied from the master cylinder via radial (in the wall of cylinder 1) intake port 12 to the chamber 25 of one network, and via axial intake port 13 (in the wall of piston 10) to the chamber 26 of the other network. The pressures exerted against the surface areas 21 and 22 collectively drive the piston 16 to the left and urge, through the force-transmitting structure 30, the brakeshoe 6, 8 against the disk 4. The hydraulic reaction force of the floating-yoke brake system causes the opposite brakeshoe 5, 7 to be applied against the disk 4. Upon the failure of one of the two networks, only surface 21 or 22 is under pressure, so that the force on the piston 16 is halved without causing asymmetric loading. Under normal circumstances the remaining braking power is adequate for the safe operation of the vehicle.

In the simplified embodiment of my invention shown in FIG. 2, the displaceable wheel-brake cylinder 1 and the auxiliary piston 10 are omitted. Piston 16 fits into the cylinder 29 whose diameter narrows at the appropriate place to receive the extension 23 of piston 16 of corresponding dimensions. In all other respects the construction and operation of the brake system is identical with that outlined in the above disclosure and provides equally for a continuing symmetrical, if diminished, force if one of the two networks should fail.

The invention described and illustrated is believed to admit of many modifications within the ability of persons skilled in the art.

I claim:

1. A hydraulically operable disk brake for a dual-network brake system having dual-compartment master-cylinder means for independently displacing at least two brake-fluid streams, and a pair of transmission networks each connected to one of the compartments of said master-cylinder means, said brake comprising a rotatable brake disk having an axis and a pair of opposite annular brake faces lying in planes generally transverse to said axis; a nonrotatable brake yoke extending along the periphery of said disk and having a pair of lobes disposed along said opposite faces, a respective brakeshoe juxtaposed with each of said faces and received in the respective lobe of the yoke; a stepped cylinder in one of the lobes of said yoke having a large-diameter portion and a small-diameter portion and a single hollow stepped piston slidably received in said cylinder with a large-diameter step received in said large-diameter portion and a small-diameter step received in said small-diameter portion, said cylinder and said piston defining in said cylinder a pair of hydraulic working chambers, said cylinder having an axially extending boss projecting with clearance into said piston and defining therewith an inner one of said chambers, said large diameter step of said piston and said cylinder forming respective shoulders in an outer one of said chambers, each of said chambers being connected to a respective one of said networks for urging said piston in the direction of said disk and applying one of said brakeshoes associated with said one of said lobes against said disk upon introduction of fluid under pressure to either of said chambers, said piston and said cylinder in each chamber having respective oppositely effective surfaces of equal area exposed to the pressure in the respective chamber, seal means preventing fluid communication between said chambers, said yoke being shiftable relatively to said disk for drawing the other of said brakeshoes thereagainst; automatically operable wear-compensating means received in said piston for re-establishing a rest position of said piston upon wear of said brakeshoes, said wear-compensating means including a spindle threaded into said boss, a spring seated against said spindle and adapted to act upon said piston to restore a predetermined brake play, and means on said spindle engageable by said piston upon advance of said piston beyond a predetermined stroke for rotating said spindle.

2. The disk brake defined in claim 1 wherein said piston receives said boss with an annular clearance communicating with said inner chamber.

3. The disk brake defined in claim 1 wherein said cylinder includes a tubular member received in said one of said lobes and defining a respective cylinder bore for said small-diameter step, said member forming a further piston having respective surfaces exposed to hydraulic pressure in said chambers and connected with said yoke for applying thereto hydraulic reaction force tending to draw said other of said brakeshoes against said disk.

4. The disk brake defined in claim 1, further comprising a pair of vents respectively formed in said yoke at an upper portion of each chamber for bleeding air therefrom.

5. The disk brake defined in claim 1, further comprising a mechanically operable mechanism interposed between said piston and said one of said brakeshoes for urging said brakeshoes against said disk upon operation of said mechanism by a vehicle driver.

6. A hydraulically operable disk brake for a dual-network brake system having a pair of transmission networks independently pressurizable to actuate the disk brake, said disk brake comprising:

a rotatable brake disk having an axis and a pair of opposite annular brake faces lying in planes generally transverse to said axis;

a nonrotatable brake yoke reaching around the periphery of said disk and shiftable transversely to said brake faces while having a pair of lobes on opposite sides of the disk;

a movable brakeshoe mounted in one lobe of said yoke and confronting the corresponding brake face of said disk while being displaceable relatively to said yoke against said disk, and a nonmovable brakeshoe mounted on the other lobe of said yoke for engagement with the other brake face of said disk upon movement of said yoke transverse to said disk in the direction of said other face, said one of said lobes forming a cylinder housing;

a cylinder member received in said housing and open at both axial ends while said housing is movable relatively to said member, said housing being formed with a cylindrical boss extending axially into said cylinder member at an end thereof remote from said one of said brakeshoes, and a sleeve spaced from said boss with all-around clearance and slidably received in said end of said cylinder member remote from said movable brakeshoe;

a hollow stepped piston received in said cylinder member and having a large-diameter step slidable in the end of said member parallel to said movable brakeshoe, and a small-diameter step slidable in said sleeve and surrounding said boss with all-around clearance, the large-diameter step of said piston and said sleeve defining in said cylinder member an outer hydraulic working chamber with oppositely effective surfaces of said piston and said housing of equal area, said boss and the interior of said piston defining within the latter an inner hydraulic working chamber having oppositely effective surfaces of the piston and the housing of substantially equal areas;

axial inlet means in said housing communicating with said inner chamber and connectable with one of said networks, and radial inlet means in said cylinder communicating with said outer chamber and connectable with the other of said networks; and automatic adjusting means for re-establishing a rest position of said piston upon advance of said piston beyond a predetermined stroke, said adjusting means including an axially extending spindle threadedly received in said boss, a spring seated against said spindle and adapted to act upon said piston to re-establish a predetermined brake play, cam means on said spindle for rotating same upon advance of said piston beyond said predetermined stroke, and means on said piston engageable with said cam means for operating same.

7. The disk brake defined in claim 6, further comprising ball-and-ramp means between said piston and said movable brakeshoe for mechanically shifting same against said disk.

References Cited

UNITED STATES PATENTS 3,266,602  8/1966  Belart et al. _____ 188—196

FOREIGN PATENTS 951,906  3/1964  Great Britain.

GEORGE E. A. HALVOSA, Primary Examiner

U.S. Cl. X.R.

188—106, 196